United States Patent [19]

Valentini

[11] 3,895,370

[45] July 15, 1975

[54] HIGH-FREQUENCY COMMUNICATION SYSTEM USING A-C UTILITY LINES

[75] Inventor: Nicola Valentini, Rome, Italy

[73] Assignee: Societe Italiana Telecomunicazioni Siemens S.p.A., Milan, Italy

[22] Filed: July 2, 1973

[21] Appl. No.: 375,432

[30] Foreign Application Priority Data

July 4, 1972 Italy ............................ 26558-A/72

[52] U.S. Cl. .............. 340/310 A; 340/416; 333/111

[51] Int. Cl. .......................................... H04m 11/04

[58] Field of Search.... 340/310 R, 416, 180, 310 A; 189/82; 307/2; 333/12, 24, 6, 11; 336/171, 229; 325/385, 294

[56] References Cited

UNITED STATES PATENTS

| | | | |
|---|---|---|---|
| 1,779,269 | 10/1930 | Clough | 336/171 |
| 2,032,360 | 3/1936 | Green | 340/310 |
| 3,641,536 | 2/1972 | Prosprich | 340/310 |
| 3,659,280 | 4/1972 | Donohoo | 340/310 |
| 3,671,885 | 6/1972 | Pennypacker | 340/310 |
| 3,696,383 | 10/1972 | Oishi et al. | 340/310 |
| 3,710,373 | 1/1973 | Watanabe et al. | 340/310 |
| 3,714,451 | 1/1973 | Witney et al. | 340/310 |

*Primary Examiner*—John W. Caldwell
*Assistant Examiner*—Richard P. Lange
*Attorney, Agent, or Firm*—Karl F. Ross; Herbert Dubno

[57] ABSTRACT

The conductors of an a-c (e.g. 60-cycle) utility line form a signal path for high-frequency communication, this path being bounded by two terminal coils each comprising a core which carries a plurality of low-inductance windings each in series with a respective line conductor. The windings all have the same number of turns so that, under normal operating conditions, the vector sum of their magnetomotive forces is zero. High-frequency transmitters and receivers are connected to one or more line conductors by being capacitively coupled thereto between the terminal coils or via respective supplemental windings on the cores of these coils. Ancillary windings on the coil cores may be used to detect an unbalance in the low-frequency current and to actuate protective devices for minimizing or stopping the flow of unbalance currents.

10 Claims, 7 Drawing Figures

FIG. 2

HIGH-FREQUENCY COMMUNICATION SYSTEM USING A-C UTILITY LINES

FIELD OF THE INVENTION

My present invention relates to a communication system using utility lines of an a-c power network for the transmission of high-frequency signals.

BACKGROUND OF THE INVENTION

Though the use of such utility lines for high-frequency signal transmission has been proposed before, difficulties are generally experienced in decoupling the low-frequency and high-frequency circuits from each other. Thus, the loads usually connected across the output ends of such lines have sufficient capacitance to present a virtual short circuit for high-frequency signals transmitted either over two parallel line conductors or over one such conductor and ground.

The insertion of inductances between an intermediate line portion, serving as a signal-transmission path, and the line terminations is not a satisfactory solution since the inductances must not represent major impedances at the frequency of the utility current. In particular, coils with ferromagnetic cores cannot be utilized for this purpose in conventional systems without undue impairment of the efficiency of the power supply.

OBJECT OF THE INVENTION

The general object of my present invention, therefore, is to provide simple but effective decoupling means in such a mixed power-supply and signal-transmission system.

A related object is to provide means for preventing abnormal conditions in the power-supply circuit (such as the accidental grounding of a line conductor) from materially affecting signal transmission in a system equipped with such decoupling means.

SUMMARY OF THE INVENTION

A system according to my present invention, utilizing part of one or more conductors of a utility line as a signal-transmission path, comprises a pair of terminal coils at opposite ends of this path, each terminal coil being provided with a plurality of windings on a common ferromagnetic core; the windings of each terminal coil, lying respectively in series with the several conductors of the utility used for power transmission, have the same number of turns whereby in normal operation the vector sum of the magnetomotive forces induced in either core is substantially zero. Thus, the core carries virtually no flux due to the low-frequency currents of the line conductors so that the impedance of the windings at these frequencies is low. On the other hand, the windings offer a high impedance to high-frequency signals traveling over one or more line conductors between one or more signal transmitters and one or more signal receivers which are connected to the transmission path and are interlinked by a return connection (e.g. ground) independent of the line; these windings, therefore, attenuate the high-frequency signals on the way to the low-frequency source, and to the associated load.

The connections between the transmitting and receiving stations, on the one hand, and the associated line conductor or conductors, on the other hand, may include a capacitive coupling at points located between the two terminal coils. It is also possible, however, to connect these stations across supplemental windings on the cores of the terminal coils, with the result that the high-frequency signals are transmitted in parallel over the several line conductors extending between these two coils; the return connection in the latter case includes capacitive junctions formed between all these conductors and ground (or a separate metallic lead) at points located beyond the terminal coils. The latter system can be expanded by the insertion of one or more intermediate coils of the same character between the two terminal coils, each intermediate coil also carrying a supplemental winding connected to a transmitting or receiving station.

In the first-mentioned type of system according to my invention, the signal currents do not reach the terminal coils so that any unbalanced flux component can only be the result of a malfunction such as an accidental grounding of a line conductor resulting in the flow of an appreciable leakage current. Such leakage currents may tend to saturate the core, thereby reducing the effectiveness of the coil in blocking the flow of signal current to a capacitive line termination acting as a virtual short circuit; such reduction of the blocking effect may also lead to cross-talk between signal-transmission paths using different line sections separated by these coils. In extreme cases, the coil may also be damaged beyond repair by the generated heat or the electrodynamic stresses.

In order to suppress the flow of low-frequency unbalance currents in the line, I may provide a protective device controlled by a sensor which includes a monitoring winding on the core of either or each terminal coil. Upon detecting an alternating flux exceeding a predetermined threshold level, the sensor actuates the protective device to break the line circuit or to close a low-resistance path for an inductance wound on the core (advantageously the monitoring winding itself) in order to generate a counter-mmf. Such a low-resistance circuit may include monitoring windings on the cores of both terminal coils interconnected by a common conductor, preferably a neutral conductor grounded at the low-frequency source (e.g. at the midpoint of a Y-connected three-phase step-down transformer); in that event the protective device associated with each terminal coil need only ground the neutral conductor at a location remote from the source.

BRIEF DESCRIPTION OF THE DRAWING

The above and other features of my invention will now be described in detail with reference to the accompanying drawing in which.

SPECIFIC DESCRIPTION

Figure 1:
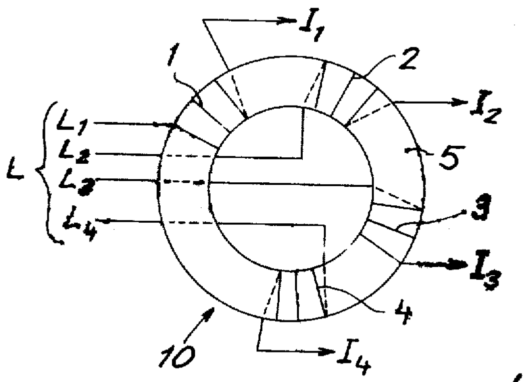
FIG. 1 is a somewhat diagrammatic face view of a terminal coil as used in a system embodying my invention.

In FIG. 1 I have shown a coil 10 comprising four windings 1, 2, 3, 4 on a common, annular ferromagnetic core 5, each of these windings having the same small number of turns. Windings 1 – 4 are respectively in series with four line conductors $L_1$, $L_2$, $L_3$ and $L_4$ carrying respective currents $\vec{I_1}$, $\vec{I_2}$, $\vec{I_3}$, $\vec{I_4}$. These currents, which may have the usual utility frequency of 60 Hz, are mutually balanced so that $$\sum_{i=1}^{4} \vec{I_i} = 0,$$

i.e. the vector sums of their currents is zero. This, in view of the equality of the number of winding turns, results in zero flux within core 5.

Conductors $L_1$ — $L_4$ may be three phase conductors and the neutral conductor of a utility line L connected in Y between a source and a load not shown in this Figure. The voltage difference between each of the phase conductors and the neutral conductor may be 220 V. or 125 V., for example.

Figure 2:
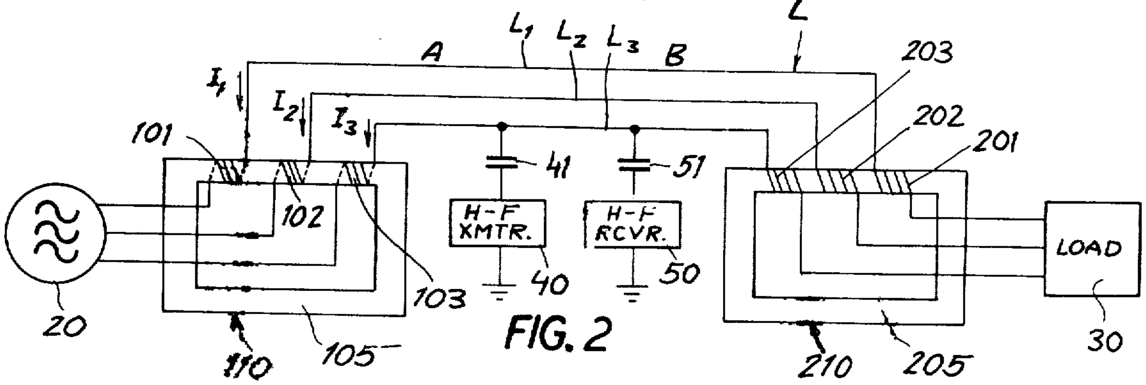
FIG. 2 is a circuit diagram of a system including two coils of the type shown in FIG. 1.

FIG. 2 shows the use of two such coils 110, 210 at opposite ends of a signal-transmission path including a section A – B of a three-conductor utility line L, specifically its phase conductor $L_3$. Line L originates at a balanced current source 20 and energizes a balanced load 30. Source 20 may be a Δ-connected three-phase power generator with a voltage difference of 380 V. or 220 V., for example, between its phase conductors $L_1$, $L_2$, $L_3$. It could also be a step-down transformer (cf. FIG. 6) serving a plurality of loads via respective lines L; in some instances these several lines may share a common input-side terminal coil 110. In any event, at least the output-side coil 210 individual to each load may be of simple and inexpensive construction.

Coil 110 carries three phase windings 101, 102, 103 traversed by balanced low-frequency currents $I_1$, $I_2$, $I_3$ so that virtually no flux circulates in its core 105. Corresponding windings 201, 202, 203 on core 205 of coil 210 are respectively in series with windings 101 – 103 and are also in balance. Thus, the windings 101 – 103, 201 – 203 constitute but minor impedances for the flow of utility current in line L. A high-frequency transmitter 40 is connected between ground and phase conductor $L_3$ in series with a capacitor 41; in an analogous manner, a high-frequency receiver 50 is connected between ground and conductor $L_3$ in series with a capacitor 51. Capacitors 41 and 51 substantially block the frequency of source 20 but readily pass the signal frequency from transmitter 40; that signal frequency, in turn, is confined to the transmission path A – B by reason of the high terminal impedances represented by windings 103 and 203. Transmitting and receiving stations 40, 50 could be located in different rooms of the same building but could also be more widely separated.

Figure 3:
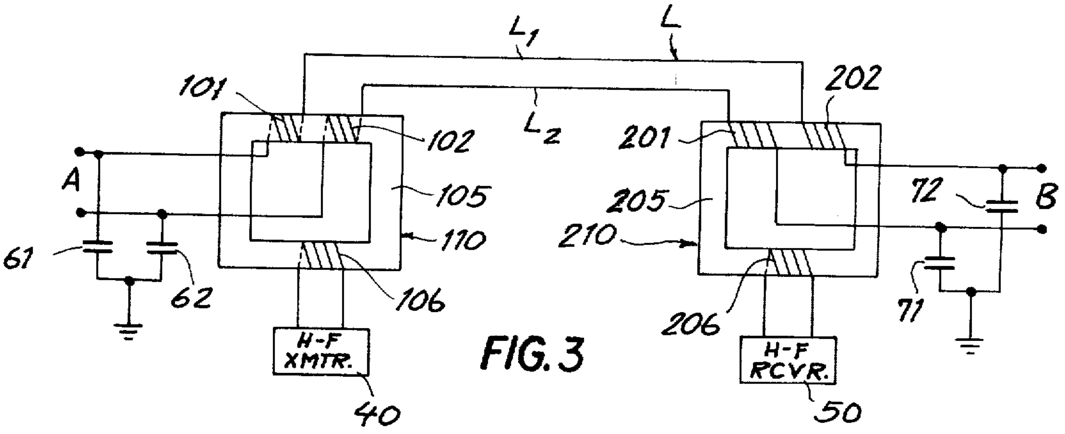
FIG. 3 is a circuit diagram similar to FIG. 2, showing an alternate embodiment.

In the system of FIG. 3 the signal-transmission path A – B extends somewhat past the terminal coils 110, 210 between a nonillustrated source of balanced single-phase current and a corresponding load not shown. The transmission line L here comprises only two conductors $L_1$, $L_2$ in series with windings 101, 102 and 201, 202 on cores 105 and 205, respectively. These cores also carry supplemental windings 106, 206 respectively connected across signal transmitter 40 and signal receiver 50. The return connection comprises two capacitors 61, 62 upstream of the input-side windings 101, 102 and two other capacitors 71, 72 downstream of the output-side windings 201, 202, these capacitors grounding the conductors $L_1$ and $L_2$ for the high signal frequencies.

As in the preceding embodiment, the low-frequency utility currents in line L do not generate any substantial flux in cores 105 and 205. However, the high-frequency message signals delivered by transmitter 40 to winding 106 give rise to secondary currents in windings 101, 102 and correspondingly energize the windings 201, 202 in series therewith, their cophasal currents reinforcing each other whereby the signals are reproduced in winding 206 for delivery to receiver 50. Thus, the signaling circuit includes the two phase conductors $L_1$, $L_2$ in parallel as well as the ground return via capacitors 61, 62 and 71, 72; if the line L had more than two conductors, as in FIGS. 1 and 2, all of them would be part of the signal-transmission path.

Figure 4:
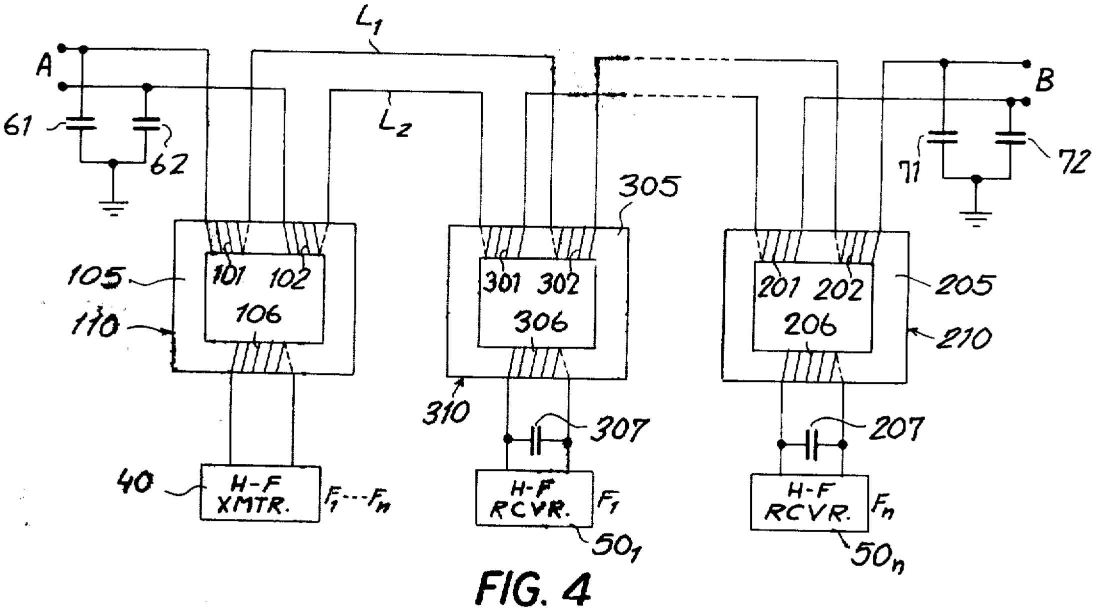
FIG. 4 is a circuit diagram illustrating a modification of the embodiment of FIG. 3.

In FIG. 4 I have shown an expansion of the system of FIG. 3 including an intermediate coil 310 between terminal coils 110 and 210. The coils are of identical construction (though the number of turns per winding may be different for the several coils), the windings 101, 102 and 201, 202 on cores 105 and 106 lying in series with respective windings 301, 302 on the core 305 of coil 310. Core 305 also carries a supplemental winding 306 tuned by a shunt capacitor 307 to a frequency $F_1$ which is one of several signal frequencies $F_1$ – $F_n$ emitted by transmitter 40; winding 206 on core 205 is similarly tuned by a shunt capacitor 207 to the signal frequency $F_n$. Other intermediate coils, not illustrated, may be disposed between coils 310 and 210 in order to pick up the remaining signal frequencies. Windings 306 and 206 feed respective receivers $50_1$ and $50_n$.

Naturally, the system of FIG. 4 could also include two or more transmitters connected, for example, across windings 106 and 306 to generate different signal frequencies to be picked up by one or more receivers such as the one fed by winding 206. The use of different frequency bands enables independent communication between any desired number of transmitting and receiving stations using the same path A – B.

In the system of FIGS. 3 and 4 the terminal coils 110 and 210 have no blocking function but merely serve (as does the intermediate coil 310 of FIG. 4) as signal transformers decoupling the low-frequency and high-frequency circuits. Their phase windings should have a low number of turns so as to minimize the series impedance encountered by the message signals.

Figure 5:
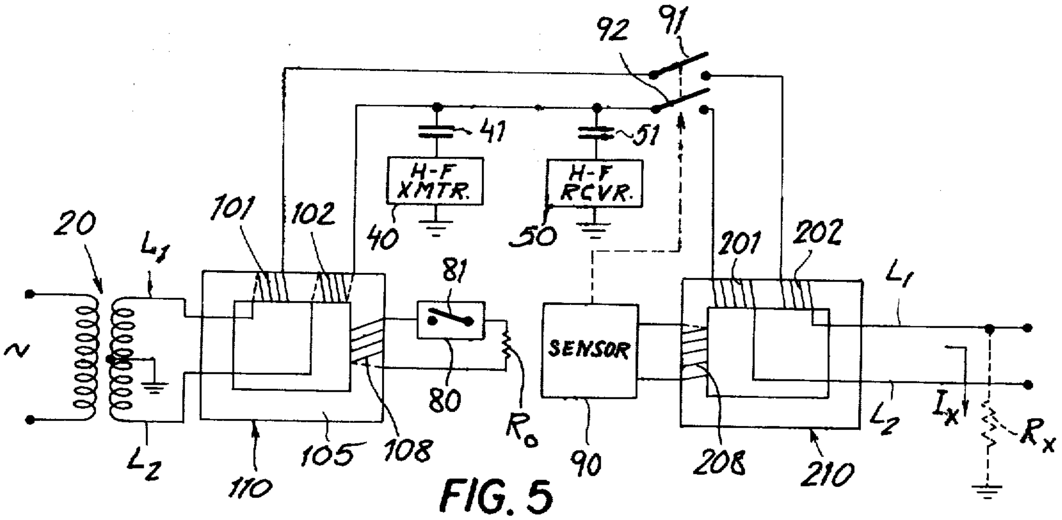
FIG. 5 is a circuit diagram similar to FIG. 1, illustrating the provision of protective means therein.

The system of FIG. 5 is similar to that of FIG. 1, with the source 20 illustrated as a transformer having a centrally grounded secondary. However, core 105 of coil 110 is shown to carry an additional winding 108 serving to monitor the flux in that core in order to ascertain the existence of any unbalance in the line, e.g. as brought about by the grounding of conductor $L_1$ by a leakage resistance $R_x$ giving rise to the flow of a stray current $I_x$. A sensor 80, including a normally open protective switch 81, is connected in series with a low resistance $R_0$ across monitoring winding 108, switch 81 and resistance $R_0$ may be jointly constituted by a voltage-responsive element such as a pair of oppositely poled Zener diodes in series, though switch 81 could also be a threshold relay (e.g. of the triac type) closing a separate circuit through resistance $R_0$. In any event, the operation of device 80 in response to substantial current unbalance results in the flow of a compensating current generating a counter-mmf with consequent flux reduction. Coil 210 carries a similar monitoring winding 208 which, in response to an appreciable leakage current, trips a sensor 90 such as a biased electromagnetic or electronic relay which opens a pair of normally closed contacts 91, 92 in series with conductors $L_1$, $L_2$ to interrupt the line current. It will be noted, however, that this interruption (as well as a closure of switch 81) is without effect upon the transmission of signals between stations 40 and 50 via capacitors 41, 51, a section of conductor $L_2$, and ground.

Figure 6:
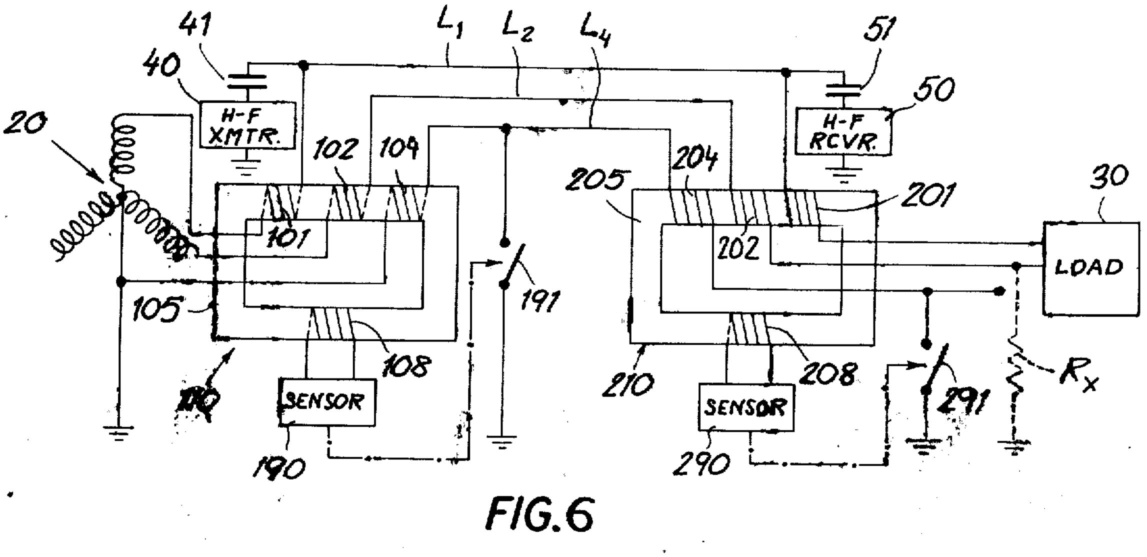
FIG. 6 is a circuit diagram illustrating a modification of the system of FIG. 5.

In FIG. 6 I have shown the secondary side of transformer 20 as including three Y-connected phase windings, one of them being open-circuited. The grounded midpoint of the Y is connected to neutral conductor $L_4$ in series with windings 104 and 204 on cores 105 and 205 of coils 110 and 210. At the load side, an extension of neutral conductor $L_4$ beyond winding 204 is left unconnected.

Monitoring windings 108 and 208 work into respective sensors 190 and 290 which control a pair of normally open contacts 191, 291 for grounding the conductor $L_4$ at points downstream of windings 104 and 204, respectively, in response to an unbalance of coil 110 or 210 due, for example, to the grounding of phase conductor $L_2$ by a leakage resistance $R_x$. Advantageously, sensor 190 has a higher operating threshold than sensor 290, or responds with a greater delay than the latter, in order that sensor 290 may react first and close the switch 291 in the presence of a leak affecting both coils, as illustrated. If the location of the leak is such as to affect primarily the sensor 190, only the switch 191 is closed. Again, the operation of either sensor is without material influence upon the transmission of signals between stations 40 and 50.

Figure 7:
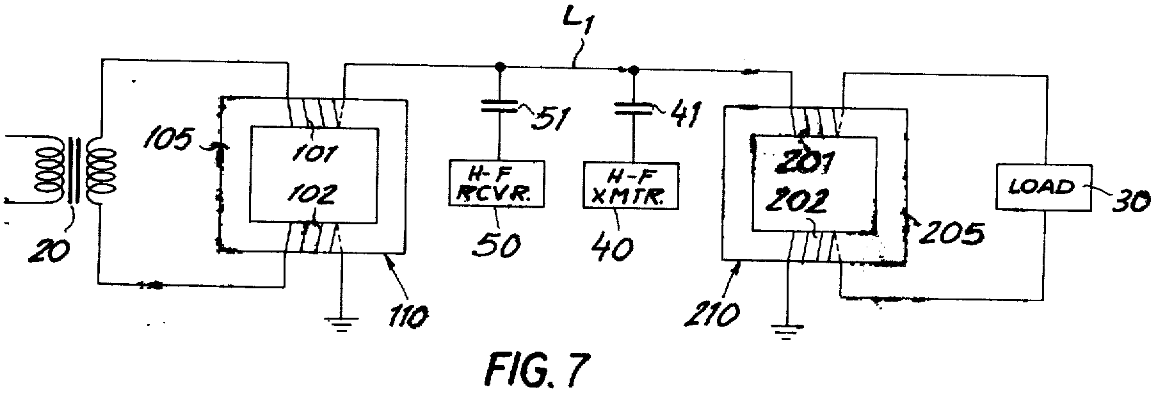
FIG. 7 is a circuit diagram of a simplified system of the general type shown in FIG. 2.

As illustrated in FIG. 7, even an inherently unbalanced line — here shown to comprise a single conductor $L_1$ — can be used for signal transmission in accordance with my invention. The power source 20, here a simple transformer secondary, is connected between conductor $L_1$ and ground in series with windings 101, 102 of coil 110 so that the number of oppositely effective ampere-turns on core 105 is the same. At the output side, load 30 is similarly inserted between conductor $L_1$ and ground in series with windings 201, 202 disposed in series-opposed relationship on the core 205 of coil 210. FIG. 7 also shows that the relative position of transmitter 40 and receiver 50, coupled to conductor $L_1$ via capacitors 41 and 51, can be reversed with reference to that of the preceding Figres.

Within the limits of compatibility, the various features illustrated in different Figures of the drawing may be combined or interchanged.

I claim:

1. In a power-supply system comprising a utility line with a plurality of parallel conductors normally carrying a substantially balanced low-frequency current between a source and a load, the combination therewith of:

a pair of terminal coils at opposite ends of a transmission path including at least one of said conductors, each of said terminal coils comprising a plurality of windings on a common ferromagnetic core, said windings having the same number of turns and lying respectively in series with all conductors of said line whereby the vector sum of the magnetomotive forces normally induced by said windings in said core is substantially zero;

transmitting means and receiving means for high-frequency signals; and first and second coupling means respectively connecting said transmission means and receiving means at spaced-apart points of said transmission path to said one of said conductors for communication with each other, said transmitting means and said receiving means being linked with each other by a return connection independent of said line, said first and second coupling means being separated from said source and said load by at least one winding on each coil for attenuating said high-frequency signals beyond said spaced-apart points.

2. The combination defined in claim 1 wherein said first and second coupling means comprise respective capacitors connected to said one of said conductors at points located between said terminal coils.

3. The combination defined in claim 1 wherein said return connection is ground.

4. The combination defined in claim 1 wherein said first and second coupling means comprise respective supplemental windings on the cores of said terminal coils, said return connection forming capacitive junctions with all conductors of said line at points beyond said terminal coils.

5. The combination defined in claim 4 wherein said transmitting and receiving means includes at least three stations intercommunicating via different frequency bands, said line being further provided with at least one intermediate coil substantially identical with said terminal coils, said stations being connected to supplemental windings on said terminal coils and on said intermediate coil, respectively.

6. The combination defined in claim 1, further comprising protective means for suppressing the flow of low-frequency unbalance currents in said line, and control means for said protective means including a monitoring winding on the core of at least one of said terminal coils.

7. The combination defined in claim 6 wherein said protective means comprises a circuit breaker in said line.

8. The combination defined in claim 6 wherein said protective means comprises switch means for closing a low-resistance circuit through an inductance wound on said core.

9. The combination defined in claim 8 wherein said inductance is constituted by said monitoring winding.

10. The combination defined in claim 9 wherein the core of each terminal coil is provided with a monitoring winding in series with a neutral conductor grounded at one end of said transmission path, said switch means being responsive to the flow of an unbalance current in either core for grounding said neutral conductor at a point remote from said one end.

* * * * *